(No Model.)
H. BATES, Jr.
PROCESS OF AND APPARATUS FOR THE MANUFACTURE OF ALIMENTARY PRODUCTS FROM CORN.
No. 476,599. Patented June 7, 1892.
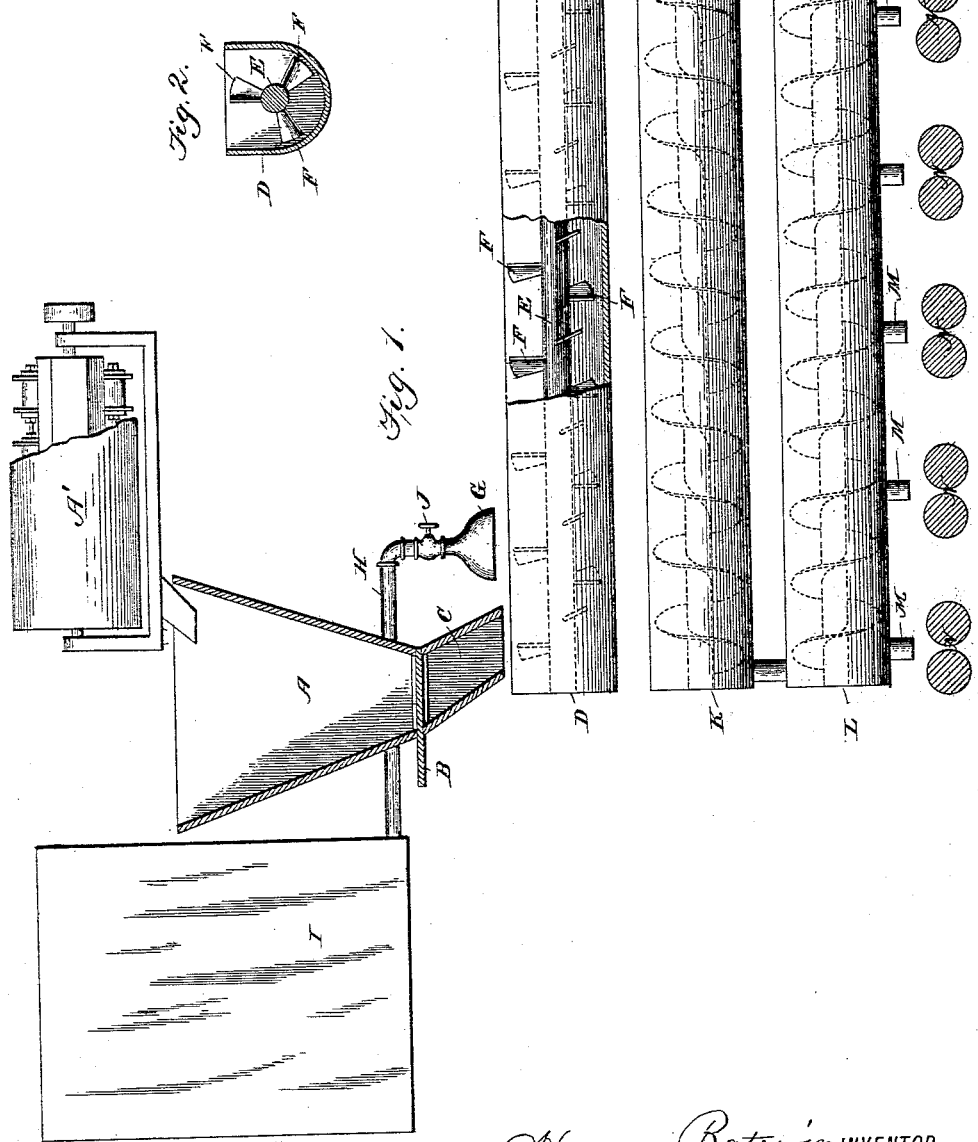
WITNESSES:
Edwin L. Bradford
Curtis Lammond
Hervey Bates jr INVENTOR
BY
ATTORNEY.

UNITED STATES PATENT OFFICE.

HERVEY BATES, JR., OF INDIANAPOLIS, INDIANA.

PROCESS OF AND APPARATUS FOR THE MANUFACTURE OF ALIMENTARY PRODUCTS FROM CORN.

SPECIFICATION forming part of Letters Patent No. 476,599, dated June 7, 1892.

Application filed June 13, 1891. Serial No. 396,190. (No model.)

*To all whom it may concern:*

Be it known that I, HERVEY BATES, Jr., a citizen of the United States, residing at Indianapolis, in the county of Marion and State of Indiana, have invented certain new and useful Improvements in the Process and Apparatus for the Manufacture of Alimentary Products from Corn; and I do hereby declare the following to be a full, clear, and exact description of the invention, such as will enable others skilled in the art to which it appertains to make and use the same.

My invention relates to the production of an alimentary product from Indian corn or maize and having the qualities and characteristics set forth in Letters Patent granted to me on the 7th day of October, 1890, and numbered 437,964.

In the practice of the art to which my invention appertains it has been customary to crack and hull the corn grains either before or after soaking the same and to also remove the germ. The product of this operation has then been immersed and soaked in warm or cold water or steam and subsequently compressed and flattened between heated or cold rollers, as set forth, respectively, in Letters Patent No. 304,722, granted Joseph Franklin Gent September 9, 1884, and the Letters Patent granted to me, as hereinbefore referred to. In practicing the art as set forth I have found that the use of steam or hot water for soaking the corn, as also the use of heated rolls for crushing and flattening the same, tends to cooking or partially cooking the corn, gelatinizing the starch, and toughening the granules, and I have also found that even with the use of moderately warm or cold water in a tank or basin where the corn is immersed and thoroughly soaked not only does it require considerable length of time to moisten the corn, but a great loss in time is experienced in the proper draining of the saturated corn of its excess of moisture, rendering it necessary to employ a series of draining vats or hoppers, the contents of which are successively delivered to the flattening-rolls. This process not only requires considerable time, but it also frequently happens that before the grain is sufficiently well drained fermentation is apt to ensue, especially if the condition of the atmosphere or its temperature is conducive to such result.

My invention has for its objects to avoid the delays incident in the present methods and also the possibility of accidental fermentation and the production of a valuable alimentary product in an economic and expeditious manner; and with these ends in view my invention consists in first subjecting the corn to the process of hulling and degerminating for the removal of the exterior skin from the kernel and extracting the germ. The hard corn granules are then placed in a suitable receptacle or hopper and fed therefrom into a conveyer-trough provided with a broken-flighted conveyer. Over the head of this trough and immediately above the point of delivery of the corn from the hopper is arranged a rose-jet upon the end of a conduit or pipe leading from a reservoir, and water is sprinkled in small quantities upon the corn, which is immediately conveyed by the rotary conveyer out of contact with and away from the falling water-spray. The conveyer-flights, being broken, serve as mixers or stirrers, and the wetted grains are tumbled or mixed together as they advance toward the tail of the trough, and thus any excess of moisture or water deposited on or adhering to any of the grains is distributed among the others, so that when the body is delivered at the tail of the conveyer it is uniformly saturated or moistened.

My invention further consists in eliminating any possible undue saturation or moisture by conveying the saturated corn through dry conveyer-troughs open at the top and finally delivering the thus-treated corn to the action of flattening-rolls in the usual manner.

In carrying out my invention I have found it desirable to employ machinery especially adapted for the purpose, and in the accompanying drawings, Figure 1 shows in elevation such machinery and the arrangement thereof as I have found efficacious. Fig. 2 is a detail sectional view of the moistening-trough.

In the drawings referred to A' represents any ordinary hulling and degerminating machine, and A represents a hopper for receiving the hulled and degerminated corn. This hopper A is provided with a slide B in its open bottom, by which the discharge of corn is regulated, and a suitable shoe C extends from the bottom of the hopper and over the head of the moistening-trough D, which is provided with a rotary shaft E, having a series of conveyer-flights F, which are so arranged, as shown, as to convey the corn toward the tail of the trough and at the same time thoroughly mix the same. Immediately over the point of delivery of the corn to the trough D is arranged a rose-jet G, connected to the end of a water-supply pipe H, leading from a reservoir I. The pipe H is provided with a suitable valve J, by which the supply of water is regulated. The moistened corn when it has reached the tail of the trough D is delivered into a second trough K, and by a reversely-operated continuous conveyer the corn is carried back toward the location where it started its movement, and it is then delivered into a third trough L, with a continuously-operating conveyer. In the bottom of this last-named trough there is a series of openings or chutes M, adapted to deliver the corn to a series of crushing and flattening rollers, which I have represented by N, and these rollers finally complete the process or treatment of the corn.

I deem it unnecessary to illustrate the details of construction of the flattening-rollers, as they may be any of the well-known constructions, and I use the reference letter N simply to indicate the location and relation of such rolls.

I have shown the apparatus or the parts thereof arranged vertically; but it is apparent that they may, except as to the water-supply and hopper, be arranged horizontally, with suitable auxiliary devices for transferring the corn from one trough to another, and it is equally apparent that where economy of space is not necessary the auxiliary evaporating-troughs may be dispensed with, and in lieu thereof the wetting and mixing trough may be correspondingly increased in length and to such extent as to bring the corn to the proper condition before delivery to the conveyer-trough over the rolls.

In practicing my invention I have used with satisfactory results a wetting and mixing trough about ten feet long and about nine inches in cross-section, as shown at Fig. 2 of the drawings, having arranged longitudinally therein a conveyer with broken flights, adapted to make about one hundred and sixty-eight revolutions per minute, and under such conditions the corn is caused to travel longitudinally at the rate of about one to two feet per minute. The supply of water is regulated somewhat by experience, but to such extent that a handful of corn picked up at or near the tail of the mixing-trough will make no visible deposit of moisture upon the hand, while at the same time producing a well-defined sensation of dampness.

The evaporating and delivery troughs K and L are provided with continuous conveyers making about fifty revolutions per minute, and the pitch of the conveyers is such that the corn will be conveyed at about the speed of from two to three feet per minute, and the continuous conveyer which delivers the corn to the succession of rolls travels at about the same speed, any suitable system of gearing and belting being employed to produce the results named.

Variations in the speed of the conveyers and of the travel of the corn may of course be made, according to the temperature of the room or the condition of the atmosphere, which is readily determined by experience.

What I claim as new, and desire to secure by Letters Patent, is—

1. The process hereinbefore described of producing an alimentary product from corn, which consists, essentially, in first hulling and degerminating the corn, then feeding the same under a spray of water at the initial point of travel, then stirring and mixing and simultaneously conveying the same longitudinally in a trough, then partially evaporating the moisture from the corn, and finally feeding the same to and flattening between rollers, substantially as and for the purpose set forth.

2. In an apparatus for treating corn to produce an alimentary product, the combination, with a mixing and conveyer trough D, provided with a broken-flighted conveyer E F, of a feeding-hopper A for delivering the corn to the trough, and a water-reservoir I, conduit-pipe H, and spraying-nozzle or rose-jet G, substantially as and for the purpose set forth.

3. In combination with the hopper A, trough D, with broken-flighted conveyer, and the spraying-nozzle G, and evaporating conveyer-trough K, substantially as and for the purpose set forth.

4. The combination and arrangement of the hopper A, water-reservoir I, rose-jet G, conveyer E F, evaporating conveyer-trough K, delivery-trough L, and crushing or flattening rolls N, substantially as and for the purpose set forth.

In testimony whereof I affix my signature in presence of two witnesses.

HERVEY BATES, JR.

Witnesses:
CURTIS LAMMOND,
GEORGE L. NIGHTINGALE.